United States Patent [19]

Hooper

[11] 4,313,597

[45] Feb. 2, 1982

[54] APPARATUS FOR USE IN FABRICATING GLASS LAMPSHADES WITH LEADED JOINTS

[76] Inventor: Orville D. Hooper, P.O. Box 1003, Petaluma, Calif. 94952

[21] Appl. No.: 153,171

[22] Filed: May 27, 1980

[51] Int. Cl.$^3$ .......... B23Q 1/00

[52] U.S. Cl. .......... 269/51; 269/79; 269/88; 269/152; 269/243; 248/218.4; 269/909

[58] Field of Search .......... 269/79, 47, 50–51, 269/48.1, 101, 152, 88, 243, 909; 248/218.4, 455, 296, 288.1

[56] References Cited

U.S. PATENT DOCUMENTS 1,016,914 2/1912 Christiana .......... 269/51
1,672,996 6/1928 Wilson .......... 269/243 X
2,583,877 1/1952 Peyron .......... 269/101 X

FOREIGN PATENT DOCUMENTS 716790 1/1942 Fed. Rep. of Germany .......... 269/79

*Primary Examiner*—Robert C. Watson
*Attorney, Agent, or Firm*—Seed, Berry, Vernon & Baynham

[57] ABSTRACT

Apparatus for use in holding a form and a partly completed lampshade with leaded joints while fabricating the lampshade, such apparatus including a swingable projecting rod adjustable to various orientations for working on the lampshade while being made on the form or being completed after the form is removed. Clamping means on the rod hold the form and lampshade in selected working position and stabilizing means are also provided on the rod for use in holding the lampshade after it is removed from the form and is being leaded on the inside.

7 Claims, 4 Drawing Figures

APPARATUS FOR USE IN FABRICATING GLASS LAMPSHADES WITH LEADED JOINTS

BACKGROUND OF THE INVENTION

The present invention relates to the art of fabricating a glass lampshade, such as a Tiffany-type shade, on a form having the desired pattern thereon and then finishing the leaded between-glass joints on the inside of the shade after the form is removed. More particularly, the invention relates to an adjustable device for holding the form in the proper position while the glass pieces are placed on the form in accordance with the pattern and the lead joints are progressively made as by the well-known soldering over copper foil technique, and for then holding the shade in proper position after removal of the form so that the leading of the joints on the inside of the shade can be completed.

When soldering a joint between glass pieces as a glass shade is being made, it is necessary to have the joint quite level. This means that the form must be turned about its center axis and also tilted back and forth from end to end as fabrication of the shade proceeds on the form. Then, after the form is removed, it becomes necessary to turn, tilt and hold the shade so that each inside joint can be soldered while it is in a generally horizontal position.

SUMMARY OF THE INVENTION

With the foregoing in mind, the present invention aims to provide an improved apparatus of simple and economical construction for easily carrying out the described initial form-handling and subsequent shade-manipulating maneuvers during fabrication of a glass lampshade.

Briefly, the apparatus of the invention involves the use of a threaded rod over which a tapered window-shade form is sleeved and held by a pair of opposed clamping nuts gripping opposite sides of a ring or spider at the narrow end of the form. This rod is rigidly mounted on the free end of an adjustable swing arm in turn swing-mounted on a stand. The rod and swing arm move as a unit in a vertical plane and are locked in selected working position by use of wing nuts and a slotted slide link which braces the swing arm. By turning the form on the rod and varying the attitude of the swing arm, it is possible to place any portion of the form in a generally horizontal position which then can be fixed by tightening the clamping nuts and the wing nuts. The invention also includes a plurality of longitudinally slotted arms which are used to stabilize the lampshade after the form has been removed. These arms are clamped together in the rod in angularly displaced positions whereat one end of each arm engages the inside of the shade to give added support until most of the soldering of the joints at the inside of the shade has been accomplished.

DETAILED DESCRIPTION OF THE PREFERRED EMBODIMENT

Figure 1:
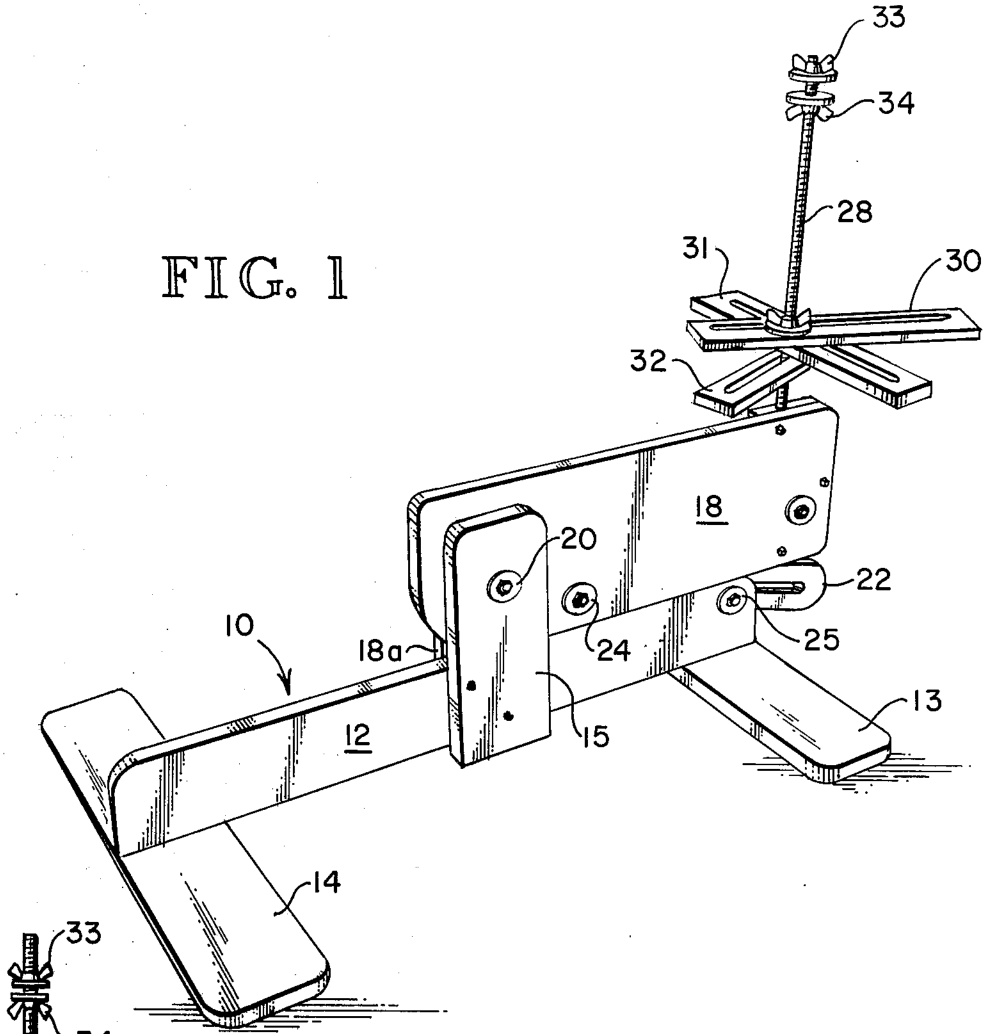
FIG. 1 is a perspective view illustrating apparatus embodying the present invention.

Referring to the drawings, it is seen that a basic stand 10 is provided comprising a longitudinal member 12, a pair of transverse front and back support feet 13, 14 secured to the underside of the member 12, and a pair of upstanding central fork plates 15, 16 bolt-connected at opposite sides of the member 12. The fork plates form a fork receiving a swing arm 18 which is pivotally mounted on a cross-bolt 20.

Figure 2:
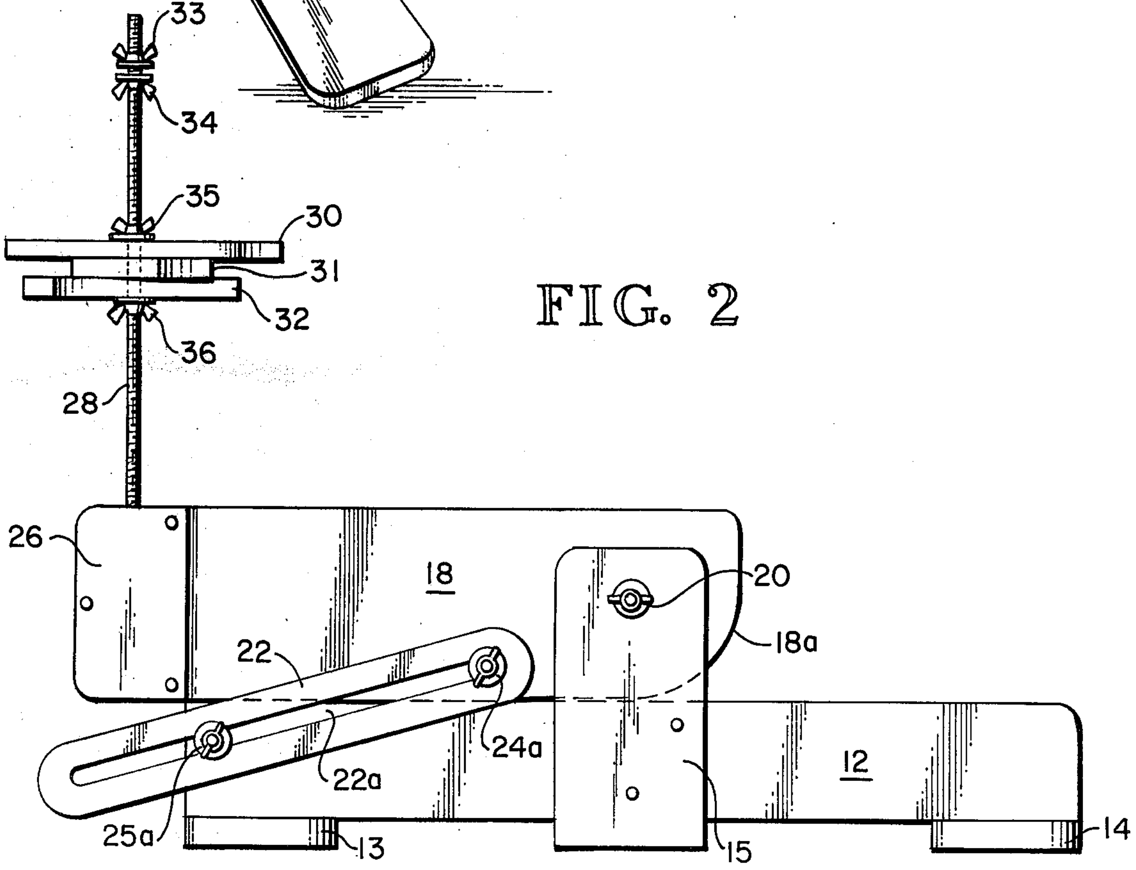
FIG. 2 is a side elevational view of the apparatus as seen from the side opposite that viewed in FIG. 1.
Figures 3, 4:
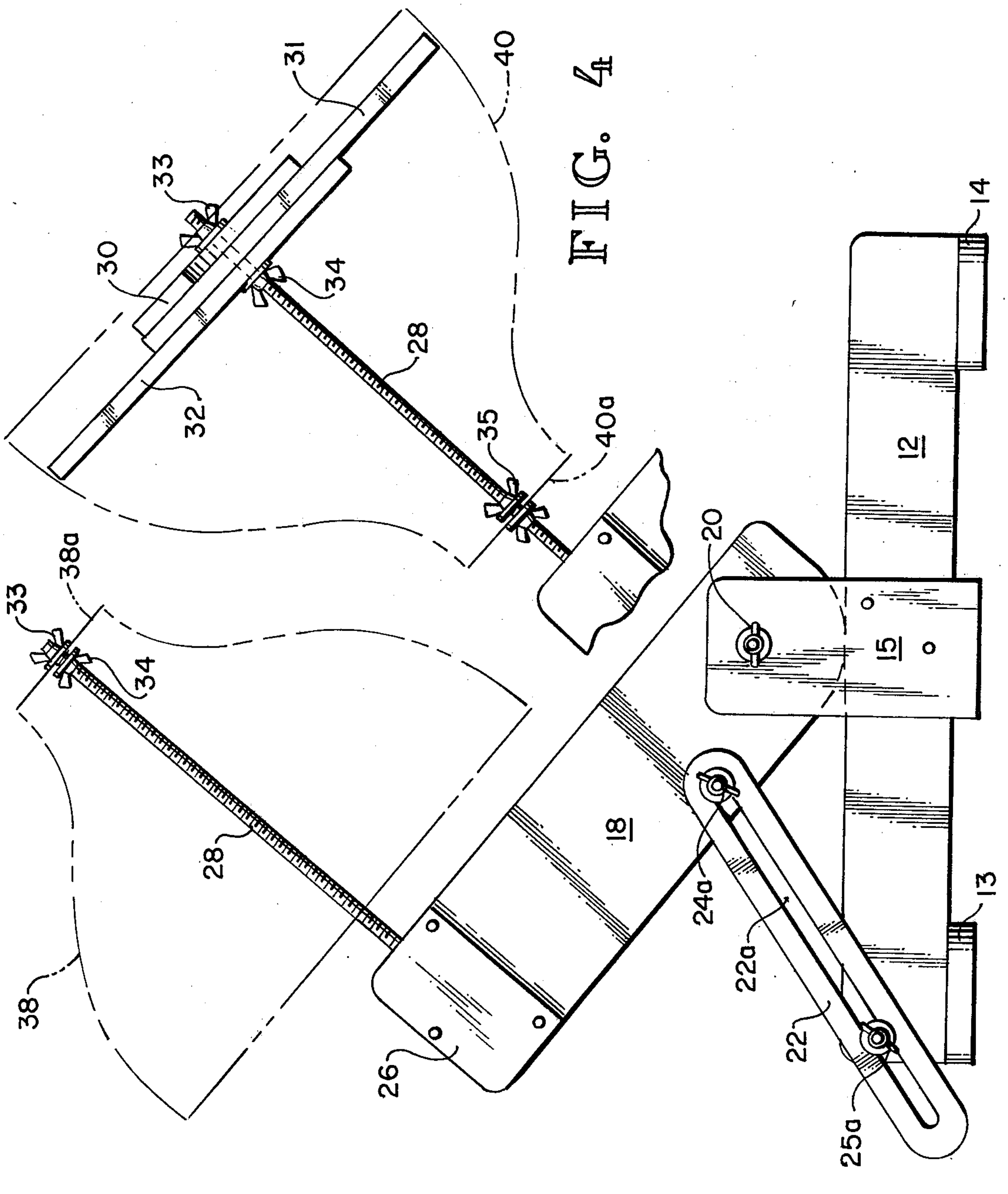
FIG. 3 is a side elevational view of the apparatus supporting a lampshade form indicated in phantom.
FIG. 4 is a fragmentary side elevational view showing the apparatus supporting a lampshade indicated in phantom.

To hold the swing arm 18 in a selected angular position from the horizontal, there is provided a longitudinally slotted link 22 having its slot 22*a* receiving a pair of bolts 24, 25 fitted with wing nuts 24*a*, 25*a*. Bolt 24 passes through the swing arm 18, and the other bolt 25 extends through the forward end portion of the longitudinal member 12. It will be noted that the rear corner portion of the swing arm is rounded at 18*a* in accordance with the vertical distance from the bolt 20 to the top edge of the member 12 so that the swing arm is free to pivot from a retracted horizontal position, resting with its lower edge on member 12, as shown in FIGS. 1 and 2, to a raised extended position, as shown in FIG. 3, whereat the rounded portion 18*a* rests on the upper edge of member 12. In its raised position, the swing arm is braced by the link 22 with the wing nuts 24*a*, 25*a* tightened.

At its forward end, the swing arm 18 has a cheek plate 26 bolted thereto for rigidly clamping the lower end portion of a threaded rod 28 at right angles to the length of the swing arm 18. The inside face of the cheek plate 26 is grooved to receive the rod 28.

For slide mounting on the rod 28, there are three longitudinally slotted, stabilizing arm members 30–32. Also provided are two pairs of wing nuts 33–34 and 35–36 to serve as clamping means on the rod.

Referring to FIG. 3, shown in phantom is a form 38 comprising a shell in the shape of the desired lampshade. This shell may be made of fiber-reinforced plastic and may have the pattern of the glass pieces for the lampshade traced thereon. The arm has its narrow end closed by a head wall 38*a* or ring having a center hole to receive the rod 28. Nuts 33–34 are used to clamp opposite faces of the head wall to secure the form relative to the rod after the form 38 has been turned in the rod so that the portion of the pattern next to be used is at the top. To make this portion generally horizontal, the angular attitude of the swing arm 38 is then adjusted accordingly and the adjusted position is maintained by tightening the locking nuts 24*a*, 25*a*. It will be noted that any portion of the form 38 can be made generally horizontal by appropriately rotating the form 38 on the rod 28 and swinging the arm 18.

Normally, the head end of the lampshade is joined to a support spider or ring corresponding to the head wall 38*a* of the form 38. This spider may be initially clamped on the rod between the outer nut 33 and the head wall 38*a*. When the lampshade has been externally finished on the form 38, the nut 33 is removed and the lampshade and form are lifted free of the rod. The lampshade is carefully removed from the form 38 and, as indicated by phantom representation 40 in FIG. 4, is placed in inverted position with its spider 40 sleeved on the rod 28 and clamped in position by nuts 35–36. Then the stabilizing arms 30-32 are sleeved on the rod and lowered into the mouth of the lampshade after nut 34 is screwed into position. Nut 33 is then screwed onto the rod, and after the arms 30-32 are arranged and extended to engage the inside face of the shade at points about 120 degrees apart, the nut is tightened to clamp the arms against the nut 34. The spaces between the stabilizing arms 30-32 are used to gain access for applying solder to the joints between the pieces of glass to finish the inside of the shade. By adjusting the rotational position of the lampshade on the rod 28 and the attitude of the swing arm 18, as previously discussed, and also adjusting the position of the stabilizing arms, it is possible to keep the joint to be next soldered in a generally horizontal position and relatively easy to reach. It will be appreciated that the stabilizing arms 30-32 can also be placed in the mouth of the form 38 and clamped by the nuts 35-36 for stabilization of the form relative to the rod 28, if desired.

The pieces of the stand 10, the swing arm 18, the clamp plate 26, and the stabilizing arms 30-32 can be fabricated from plywood or any other suitable material. Instead of clamping the rod 28 to the swing arm 18 by the cheek plate 26, the rod 28 can be journaled between the arm 18 and cheek plate for rotational adjustment and then locked by a set screw (not shown) extending through the plate 26 on the swing arm 18.

I claim:

1. Apparatus for use in fabricating glass lampshades by use of a form, comprising:

a support a projecting rod having a free end, said rod being adapted to receive, for selected movement therealong from said free end and for selected rotation therearound, either a lampshade form or an internally unfinished glass lampshade after removal of the form;

swing arm means carrying said rod and swing-mounted on said support to move in a vertical plane for selectively moving said rod relative to the support to various working positions;

locking means operatively associated with said swing arm means for locking it to keep the rod in a selected working position; and clamping means on said rod and adjustable therealong for either holding a said form sleeved on the rod with the open end of the form facing away from said free end of the rod or holding a said internally unfinished form sleeved on the rod with the open end of the lampshade facing toward said free end so that there is ready access to the inside of the lampshade for completing finishing thereof, said clamping means permitting a said form or a said lampshade to be rotationally adjusted on the rod so that this rotational adjustment together with adjustment of the rod relative to the support by use of the swing arm means and locking means makes it possible to selectively place each part of the form and lampshade in a generally horizontal working position.

2. Apparatus according to claim 1, in which said rod is externally threaded and said clamping means includes opposed nuts screwed onto the rod.

3. Apparatus according to claim 1, in which said rod extends at right angles from said swing arm and is also in said vertical plane.

4. Apparatus according to claim 1, in which said locking means includes a slide link extending between said swing arm and said support.

5. Apparatus according to claim 1, in which said rod is externally threaded and extends at right angles from said swing arm in said vertical plane, and said clamping means includes opposed nuts screwed onto the rod.

6. Apparatus according to claim 1, in which adjustable stabilizing means is sleeved in the rod for engaging the inside of the lampshade while it is being finished on the inside.

7. Apparatus according to claim 6, in which said stabilizing means includes three longitudinally slotted arms and a second clamping means on the rod for fixing said arms as a unit relative to the rod after adjustment.

* * * * *